United States Patent Office 2,816,089
Patented Dec. 10, 1957

2,816,089

VULCANIZABLE POLYSILOXANE COMPOSITIONS CONTAINING A DIARALKYL PEROXIDE AND PROCESS

William D. Willis, Wilmington, Del., assignor to Hercules Powder Company, Wilmington, Del., a corporation of Delaware No Drawing. Application March 25, 1955
Serial No. 496,907

6 Claims. (Cl. 260—46.5)

The present invention relates to vulcanizable polysiloxane compositions and methods of preparing elastomeric polysiloxanes therefrom.

Elastomeric compositions of matter comprising heat-converted, elastic, hydrocarbon-substituted polysiloxanes (commonly known as "silicone rubbers") have found extensive use in industry, particularly in applications requiring resistance to elevated temperatures for extended periods of time. Heretofore, these elastomeric polysiloxanes have been prepared by hardening vulcanizable polysiloxanes by heating them in the presence of certain organic peroxides. As far as is known, benzoyl peroxide was the first peroxide found to be useful for the vulcanization of such materials and is still the most widely used peroxide. Subsequent to the discovery that benzoyl peroxide was satisfactory as a vulcanizing agent for the production of elastomeric polysiloxanes, many other organic peroxides have been tried as vulcanizing agents but only very few of these have been found to be satisfactory. It has been reported in the literature, for example, that peroxides such as cumene hydroperoxide, di(tertiary butyl) peroxide, diisopropylbenzene hydroperoxide, tertiary butyl hydroperoxide, dibenzal diperoxide, urea peroxide, 1-hydroxycyclohexyl hydroperoxide-1, and others of similar nature were ineffective for the stated purpose either because their use resulted in elastomers decidedly inferior to those produced using benzoyl peroxide as a vulcanizing agent, or because they failed to provide any vulcanizing effect under the influence of heat. Although benzoyl peroxide is still widely used as a vulcanizing agent in the production of elastomeric polysiloxanes from vulcanizable polysiloxanes, its use involves numerous disadvantages which the art has long sought to overcome. One of the difficulties encountered using benzoyl peroxide is the inability to obtain suitably cured elastomeric polysiloxanes when any form of carbon is employed as a filler. For example, when carbon black is employed as a filler, it exercises a strong inhibiting effect on the curing properties of benzoyl peroxide, resulting ultimately in inferior products.

Another disadvantage inherent in the use of benzoyl peroxide as the vulcanizing agent is that it is not possible to produce suitably-vulcanized elastomeric polysiloxanes having relatively thick cross sections.

It is an object of the present invention to provide a vulcanizable polysiloxane composition and a method of vulcanizing the same, which composition and method may include carbon as one of the ingredients and may also be utilized for the preparation of elastomeric polysiloxanes having relatively thick cross sections.

In accordance with the invention, it has been discovered that di(aralkyl) peroxides, having the structural formula

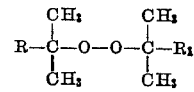

where R is phenyl and $R_1$ is selected from the group consisting of phenyl and methylphenyl, are effective vulcanizing agents for vulcanizable polysiloxanes even when carbon is employed as a filler and even when the polysiloxane is vulcanized in thick cross section. The invention thus provides a composition of matter comprising a vulcanizable polysiloxane and a minor amount of a peroxide of the above structural formula. The invention further provides a method for producing an elastomeric polysiloxane which comprises heating the composition of the invention until an elastomeric product is obtained.

Before illustrating the invention by means of specific examples, it is pointed out that the peroxides utilized in the composition and method of the present invention are characterized by decomposition temperatures higher than the decomposition temperature of benzoyl peroxide. For this reason the optimum vulcanizing temperature of the peroxides employed in the invention is somewhat higher than the optimum vulcanizing temperature when benzoyl peroxide is employed. Specifically, the optimum temperature recommended for benzoyl peroxide vulcanizations is approximately 250° F., whereas the optimum vulcanizing temperature recommended for the process of the present invention is approximately 300 to 350° F. For comparative purposes, many of the examples that will be presented employ 250° F. in the benzoyl peroxide vulcanizations and 300° F. in the vulcanization method of the invention. It is understood in view of the above explanation that the use of 300° F. as the vulcanizing temperature for benzoyl peroxide would not provide fair comparison because the properties of the resulting elastomeric polysiloxane have been found to be somewhat poorer than the properties of similar products vulcanized at 250° F.

The fact that the method of the invention requires a higher vulcanizing temperature for optimum cure is not to be construed as a major disadvantage. Instead, in many cases it is a definite advantage. For instance, in the manufacture of expanded elastomeric products, nitrogen-containing blowing agents that liberate nitrogen at temperates higher than 250° F. are often employed; consequently, in such instances, it is desirable to vulcanize at a temperature higher than 250° F. The process of the invention is thus more readily adaptable to the manufacture of expanded elastomers than is the prior art process utilizing benzoyl peroxide.

In order to further illustrate the invention and its accompanying advantages, the following specific examples are presented. Parts and percentages are by weight unless otherwise specified.

EXAMPLE 1

A composition comprising 100 parts of a vulcanizable methyl polysiloxane having an average molecular weight of 400,000 to 500,000 and containing approximately two methyl groups per silicon atom (prepared by hydrolyzing dimethyldichlorsilane and condensing the resultant polysiloxane with ferric chloride hexahydrate), 39 parts HiSil X303 (a silica aerogel supplied by the Pittsburgh Plate Glass Company), and 20 parts zinc oxide was prepared by compounding the specified ingredients on a 2-roll rubber mill at a temperature ranging from 75–125° F. On completion of compounding, the resulting masterbatch was allowed to stand for 1 day at room temperature and then separated into equal portions. One portion of the masterbatch was milled with an amount of bis ($\alpha,\alpha$-dimethylbenzyl) peroxide equal to 3% of the silicone gum and another portion was milled with 3% of benzoyl peroxide based on the silicone gum. Intimate mixing was achieved by peeling the stock from the rolls with a doctor blade and end-rolling 6 times.

Each portion of the vulcanizable composition thus produced was vulcanized in a mold 2.75 x 2.75 x 0.50 inch in size. The vulcanizing time was 60 minutes; the vulcanizing temperature was 300° F. in the case of the bis($\alpha,\alpha$-dimethylbenzyl) peroxide-catalyzed portion and 250° F. in the case of the benzoyl peroxide-catalyzed portion. The blocks of elastomeric polysiloxane that resulted were allowed to cool to room temperature and then measured. The blocks were next placed in an air oven at 350° F. for 4 hours, cooled and again measured at which time Shore A Hardness measurements were also made on both blocks. It was observed that the block vulcanized by means of bis($\alpha,\alpha$-dimethylbenzyl) peroxide was hard and resilient whereas the block vulcanized with benzoyl peroxide was soft and spongy and poorly cured in the interior.

The dimension and hardness data are as follows:

Table I

| | Bis ($\alpha,\alpha$-dimethylbenzyl) peroxide | Benzoyl Peroxide |
|---|---|---|
| Dimensions of Mold, (inches) | 2.75 x 2.75 x 0.50 | 2.75 x 2.75 x 0.50 |
| Dimensions of Press Cured Blocks, (inches) | 2.68 x 2.65 x 0.496 | 2.70 x 2.65 x 0.495 |
| Dimensions After Oven Cure, (inches) | 2.65 x 2.60 x 0.495 | 2.93 x 2.95 x 0.497 |
| Shore A Hardness After Oven Cure | 45 | 19 |

The superiority of the block produced according to the invention is evident.

EXAMPLE 2

A masterbatch comprising 100 parts of the silicone gum used in Example 1, 39 parts HiSil X303, and 20 parts zinc oxide was prepared by compounding on a 2-roll rubber mill at a temperature ranging from 75–125° F. The masterbatch was then allowed to stand for one day. Aliquot portions of the masterbatch were next banded on the mill and a predetermined amount of bis($\alpha,\alpha$-dimethylbenzyl) peroxide was added to each of the various portions. Each portion was then intimately mixed by peeling the stock from the roll with a doctor blade and end-rolling it 6 times. After allowing the composition to mill to 2 minutes with a free rolling nip to establish the mill direction, each portion was sheeted from the roll at a thickness of approximately 0.085 inch and allowed to stand for 1 hour at room temperature.

Precut slabs of each portion were next placed in a 6 x 6 x 0.075 inch mold and cured at a pressure of 700 p. s. i. using varied cure times and temperatures. On completion of the cure, each cured sheet was removed from its mold and allowed to stand for 1 hour at room temperature. Next, A. S. T. M. type "C" tensile test specimens were cut from each sheet for determination of unaged physical properties. Additional type "C" specimens were given a second cure in a circulating air oven at 350° F. for 48 hours before testing. The data obtained by testing were as follows:

Table II

| Parts Bis($\alpha,\alpha$-dimethylbenzyl) peroxide/ 100 Parts Silicone Gum | Cure Time, Min. at 300° F. | Tensile Strength, p. s. i. | | Elongation, percent | | Shore A Hardness | |
|---|---|---|---|---|---|---|---|
| | | Initial Press Cure | Second Cure In Air Oven 48 Hrs. at 350° F. | Initial Press Cure | Second Cure In Air Oven 48 Hrs. at 350° F. | Initial Press Cure | Second Cure In Air Oven 48 Hrs. at 350° F. |
| 0.5 | 60 | 200 | 170 | 700 | 170 | 35 | 53 |
| 1.0 | 60 | 580 | 360 | 740 | 290 | 39 | 55 |
| 2.5 | 45 | 870 | 580 | 600 | 250 | 47 | 62 |
| 5.0 | 45 | 850 | 620 | 430 | 170 | 53 | 67 |

The data show that good products were obtained even with 0.5 part of peroxide per 100 parts of silicone gum. However, at least 1 part of peroxide per 100 parts of silicone gum is preferred at the cure times and temperatures investigated. The data also show that an after cure in an oven is not helpful to tensile strength when the initial press cure is adequate.

EXAMPLE 3

To each of several portions of the masterbatch prepared in Example 1 there was added varying amounts of Phil-black 0 (furnace black). Also to each portion there was added 2.5 parts of either bis($\alpha,\alpha$-dimethylbenzyl) peroxide or benzoyl peroxide per 100 parts of silicone gum and the mixtures compounded as in Example 1. The following table gives the amount of carbon in each portion, the peroxide utilized, the physical properties of the various samples after being cured at 300° F., and the same physical properties following a second cure in an air oven for 48 hours at 350° F.:

*Table III*

| Parts Carbon/ 100 Parts Silicone Gum With Bis (α,α-dimethyl-benzyl) peroxide | Cure Time, Min. at 300° F. | Optimum Tensile Strength, p. s. i. | | Elongation, Percent | | Shore A Hardness | |
|---|---|---|---|---|---|---|---|
| | | Initial Press Cure | Second Cure In Air Oven 48 Hrs. at 350° F. | Initial Press Cure | Second Cure In Air Oven 48 Hrs. at 350° F. | Initial Press Cure | Second Cure In Air Oven 48 Hrs at 350° F. |
| 0.0 | 45 | 870 | 580 | 600 | 250 | 47 | 62 |
| 1.0 | 30 | 830 | 570 | 520 | 240 | 44 | 60 |
| 2.0 | 45 | 750 | 470 | 415 | 200 | 49 | 60 |
| 25.0 | 60 | 140 | 240 | 120 | 100 | 61 | 73 |
| Parts Carbon/ 100 Parts Silicone Gum With Benzoyl Peroxide | Cure Time, Min at 250° F. | | | | | | |
| 0.0 | 15 | 630 | 550 | 690 | 360 | 36 | 52 |
| 1.0 | 15 | 130 | 200 | 470 | 310 | 42 | 52 |
| 2.0 | 30 | (¹) | 80 | 430 | 250 | 36 | 48 |
| 25.0 | 60 | (²) | (³) | (³) | (³) | (³) | (³) |

¹ Too low to measure (below 40 p. s. i.).
² Did not cure at 250° F. or at 300° F.
³ Did not cure.

The data in the table show that benzoyl peroxide is strongly inhibited by the carbon whereas the bis(α,α-dimethylbenzyl) peroxide is much less inhibited.

EXAMPLE 4

The procedure of Example 1 was followed in preparing formulations containing from 0.5 to 5 parts of bis(α,α-dimethylbenzyl) peroxide per 100 parts of silicone gum. The effect of vulcanizing temperature was investigated by vulcanizing formulations for different times at 275° F., 300° F. and 350° F. The following table shows the green tensile strengths of the samples:

*Table IV*

| Peroxide Concentration (Parts by Weight) | Cure Time, Min. | Cure Temperature, ° F. | | |
|---|---|---|---|---|
| | | 275 | 300 | 350 |
| 0.5 | 45 | | | 180 |
| | 60 | | 200 | |
| | 15 | | | 590 |
| 1.0 | 45 | | 540 | |
| | 60 | | 580 | |
| | 7½ | | | 840 |
| 2.5 | 15 | | 760 | |
| | 30 | | 790 | |
| | 45 | | 870 | |
| | 3 | | | 910 |
| | 7½ | | | 830 |
| 5.0 | 15 | | 670 | |
| | 30 | 680 | 810 | |
| | 45 | | 840 | |
| | 60 | 850 | | |

It is evident from the data that above 300° F. the higher the temperature, the more rapid the cure and also the greater the amount of catalyst, the more rapid the cure.

EXAMPLE 5

The procedure of Example 1 was followed substituting 3 parts of α,α-dimethylbenzyl(α,α-dimethyl-p-methylbenzyl) peroxide for the bis(α,α-dimethylbenzyl) peroxide. The vulcanization was carried out at 300° F. for 60 minutes in each instance. The block of elastomeric polysiloxane which resulted was hard, resilient and dimensionally stable.

The vulcanizable polysiloxanes with which this invention is concerned may be described more specifically as heat-convertible, solid, elastic, hydrocarbon-substituted polysiloxanes consisting of hydrocarbon radicals and silicon and oxygen atoms having the recurring structural units

where R and R' are the same or different monovalent hydrocarbon radicals, for example, aliphatic radicals, for instance, alkyl radicals, e. g., methyl, ethyl, propyl, isopropyl, etc. and vinyl radicals, etc.; aryl radicals, for instance, phenyl, naphthyl, etc.; aralkyl radicals, for instance benzyl, phenylethyl, etc., alkaryl radicals, for instance tolyl, etc.; and alicyclic radicals, for instance, cyclopentyl, cyclohexyl, etc. Preferably, R and R' are lower alkyl radicals, more particularly the methyl radical, and are the same. Also, preferably, the vulcanizable polysiloxanes are those in which the average ratio of hydrocarbon groups to silicon atoms ranges from about 1.95 to 2.05 hydrocarbon groups per silicon atom. These vulcanizable polysiloxanes are materials well known to the art and can be prepared by any of several methods.

The di(aralkyl) peroxides of this invention decompose at a moderate rate under vulcanization conditions to form aralkoxy free radicals. Thus, bis(α,α-dimethylbenzyl) peroxide decomposes to form two α,α-dimethylbenzyloxy free radicals and α,α-dimethylbenzyl(α,α-dimethyl-p-methylbenzyl) peroxide decomposes to produce an α,α-dimethylbenzyloxy free radical and an α,α-dimethyl-p-methylbenzyloxy free radical. The decomposition of these peroxides is almost entirely dependent upon temperature. A particularly advantageous characteristic of these peroxides is their stability during compounding and their reactivity during vulcanization.

The peroxides of this invention can be prepared by methods known to the art. A particularly convenient method involves condensation of cumene hydroperoxide and an alcohol having the general formula

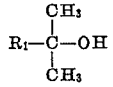

where $R_1$ is the same as in the general formula for the peroxides of this invention. The amount of alcohol utilized should be at least the theoretical calculated amount to combine with all the hydroperoxide and preferably slightly in excess of this amount. The condensation of the hydroperoxide with the alcohol is carried out in the presence of a catalytic amount up to 0.5% of an acid-acting condensation catalyst based on the weight of the alcohol, and the temperature can be between 50° C. and 120° C. p-Toluene sulfonic acid may be utilized as the acid-acting condensation catalyst. The hydroperoxides and alcohols mentioned above may be prepared in accordance with processes well known to the art.

The quantity of peroxide utilized in preparing the compositions of this invention will depend to a great extent upon the conditions to be utilized during vulcanization of the composition. In general, the quantity may vary from about 0.5% to 10% based on the weight of the vulcanizable polysiloxane. The preferred amount is from about 1% to about 7.5%. The amount of peroxide used may also vary depending upon the type of polysiloxane, the nature of the composition, that is, the type of filler present, etc., and the properties desired in the product. The compounding of vulcanizable polysiloxanes and the vulcanization thereof are well known and the same manipulative techniques may be utilized in practicing this invention.

In order to prepare an elastomeric polysiloxane from the vulcanizable polysiloxane, the latter is customarily compounded on differential speed two-roll rubber mills and fillers added to obtain a desirable milling consistency. The peroxide and accessory materials which may be desired are incorporated with continued milling. The milled composition is then formed into the desired shape and molded under the influence of heat. The molded product may be further cured or heat treated in an oven until the desired degree of cure is obtained.

As shown in the examples, fillers of various types can be included in the composition. By way of mention, suitable fillers include lithopone, ferric oxide, titanium dioxide, talc, zinc oxide, the various forms of carbon such as channel black, gas black, furnace carbons, acetylene black, etc., and various forms of silica. Optimum vulcanization takes place only in a neutral or alkaline system and, accordingly, acidic fillers are preferably used in conjunction with basic fillers such as zinc oxide to maintain neutrality or alkalinity. The aforementioned fillers may be incorporated in amounts ranging from about 10–90%, preferably from about 25–75%, of the total weight of filler and vulcanizable polysiloxane. There can also be present in the composition various other materials, such as dyes, pigments, plasticizers, mold lubricants, etc., which are known to the art.

The vulcanization times and temperatures that can be employed are, of course, interrelated with the amount of peroxide employed. In most cases, a substantially complete vulcanization can be obtained at temperatures ranging from about 275° F. to 500° F. with 300–350° F. being preferred. The time required varies, in general, from about 15 minutes to 2 hours for substantially complete vulcanization.

What I claim and desire to protect by Letters Patent is:

1. The composition comprising a vulcanizable polysiloxane and a minor amount of a peroxide having the structural formula

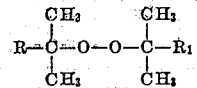

where R is phenyl and $R_1$ is selected from the group consisting of phenyl and methylphenyl, said vulcanizable polysiloxane consisting of hydrocarbon radicals and silicon and oxygen atoms and having the recurring structural unit:

where R and R' are monovalent hydrocarbon radicals and wherein the average ratio of hydrocarbon groups to silicon atoms ranges from about 1.95 to 2.05.

2. The composition of claim 1 in which the peroxide is $\alpha,\alpha$-dimethylbenzyl($\alpha,\alpha$-dimethyl-p-methylbenzyl) peroxide.

3. The composition of claim 1 in which the peroxide is bis($\alpha,\alpha$-dimethylbenzyl) peroxide.

4. The method for producing an elastomeric polysiloxane which comprises heating the composition of claim 1 until an elastomeric product is obtained.

5. The method for producing an elastomeric polysiloxane which comprises heating the composition of claim 2 until an elastomeric product is obtained.

6. The method for producing an elastomeric polysiloxane which comprises heating the composition of claim 3 until an elastomeric product is obtained.

References Cited in the file of this patent

UNITED STATES PATENTS

| 2,426,476 | Vaughan et al. | Aug. 26, 1947 |
| 2,557,928 | Atkinson | June 26, 1951 |

OTHER REFERENCES

Rochow: Chemistry of the Silicones, 2nd ed., Wiley, 1951, page 74. (Copy in Scientific Library.)